United States Patent Office 3,278,501
Patented Oct. 11, 1966

3,278,501
PROCESS FOR PREPARING POLYMERS OF ACRYLAMIDE WITH ETHYLENICALLY UNSATURATED SULFINES
Frederick E. Bailey, Jr., and Edward M. La Combe, Charleston, W. Va., assignors to Union Carbide Corporation, a corporation of New York
No Drawing. Filed Aug. 10, 1961, Ser. No. 130,482
5 Claims. (Cl. 260—79.7)

This invention relates to a method of preparing novel, normally solid, water-soluble polymers of acrylamide with certain alpha-ethylenically unsaturated sulfines, i.e. sulfonium compounds possessing a terminal ethylenic unsaturation; said novel polymers being disclosed and claimed in copending application Serial No. 327,092, filed November 29, 1963, which is of common assignee. These novel polymers are of particular utility as flocculants for flocculation of the disperse phase of aqueous anionic suspensions, as disclosed and claimed in United States Patent 3,214,370 which is also of common assignee.

More particularly, the novel polymers with which this invention is concerned include copolymers containing, in polymerized form and on a theoretical monomer basis, from about 20 to about 95 mole percent and preferably from about 40 to about 70 mole percent of acrylamide, and from about 5 to about 80 mole percent and preferably from about 30 to about 60 mole percent of an alpha-ethylenically unsaturated sulfine of the general formula:

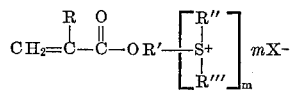

wherein R designates either a hydrogen atom or a methyl radical; R′ designates a saturated aliphatic hydrocarbon radical containing from 1 to 4 and preferably from 2 to 3 carbon atoms, such radical more preferably being unsubstituted in the position adjacent to the oxygen atom to which it is directly connected; R″ designates an alkyl radical containing from 1 to 4 and preferably from 1 to 2 carbon atoms, R‴ designates either a methyl or carboxymethyl (—CH$_2$COOH) radical; X designates a halogen atom, such as a bromine, iodine or chlorine atom, or a methyl sulfate (—OSO$_3$CH$_3$) radical, and specifically designates a chlorine atom when R‴ designates a carboxymethyl radical; and m designates an integer of from 1 to 2. Moreover, in those instances when m is 1, the sulfonium radical

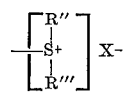

is preferably attached to that carbon atom of the radical designated by R′ which is farthest from the adjacent oxygen atom, i.e., the carbon atom in the 1-position. When m is 2, the sulfonium radicals are preferably attached to vicinal carbon atoms of the radical designated by R′, and more preferably to those vicinal carbon atoms of the radical which are farthest from the adjacent oxygen atoms, i.e., the carbon atoms in the 1,2-position. In addition, when m is 2, R′ more preferably contains at least 3 carbon atoms.

As illustrative of the alpha-ethylenically unsaturated sulfines which, in polymerized form, are a component of the polymers of this invention, there can be mentioned:

acryloxymethyldimethylsulfonium methylsulfate,
(2-acryloxyethyl)dimethylsulfonium methylsulfate,
(2-acryloxyethyl)dimethylsulfonium bromide,
(2-acryloxyethyl)dimethylsulfonium iodide,
(2-acryloxyethyl)methylethylsulfonium methylsulfate,
(2-acryloxyethyl)methylbutylsulfonium methylsulfate,
(3-acryloxypropyl)dimethylsulfonium methylsulfate,
(4-acryloxybutyl)dimethylsulfonium methylsulfate,
(2-methacryloxyethyl)dimethylsulfonium methylsulfate,
(acryloxymethyl)carboxymethylmethylsulfonium
  chloride,
(2-acryloxyethyl)carboxymethylmethylsulfonium
  chloride,
(2-acryloxyethyl)carboxymethylethylsulfonium chloride,
(2-acryloxyethyl)carboxymethylbutylsulfonium chloride,
(3-acryloxypropyl)carboxymethylmethylsulfonium
  chloride,
(4-acryloxybutyl)carboxymethylmethylsulfonium
  chloride,
(2-methacryloxyethyl)carboxymethylmethylsulfonium
  chloride,
3-acryloxypropyl-1,2-bis(dimethylsulfonium) di(methylsulfate,
3-methacryloxypropyl-1,2-bis(dimethylsulfonium)
  di(methylsulfate),
4-acryloxybutyl-1,2-bis(dimethylsulfonium) di(methylsulfate),
4-methacryloxybutyl-1,2-bis(dimethylsulfonium)
  di(methylsulfate),
3-acryloxypropyl-1,2-bis(carboxymethylmethylsulfonium) dichloride,
4-methacryloxybutyl-1,2-bis(carboxymethylmethylsulfonium) dichloride, etc.

The preferred sulfine monomers are the compounds represented by the formulae:

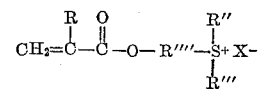

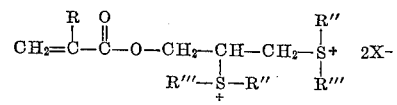

wherein R, R″, R‴ and X are as defined above, and R⁗ designates a saturated aliphatic hydrocarbon radical containing from 2 to 3 carbon atoms.

This invention also contemplates the production and use of a terploymer containing, in polymerized form and on a theoretical monomer basis, from about 20 to about 95 mole percent of acrylamide and from about 5 to about 80 mole percent of a mixture comprised of at least 50 mole percent of an alpha-ethylenically unsaturated sulfine as defined above, together with an alpha-ethylenically unsaturated thioether represented by the formula:

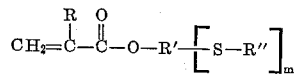

wherein R, R′, R″ and m are as defined above. As illustrative of such alpha-ethylenically unsaturated thio-ethers, there can be mentioned:

methylthiomethyl acrylate,
2-methylthioethyl acrylate,
2-ethylthioethyl acrylate,
2-butylthioethyl acrylate,
3-methylthiopropyl acrylate,
4-methylthiobutyl acrylate,
2-methylthioethyl methacrylate,
2,3-bis(methylthio)propyl acrylate,
2,3-bis(methylthio)propyl methacrylate,
3,4-bis(methylthio)butyl acrylate,
3,4-bis(methylthio)butyl methacrylate, etc.

Thus, the polymers of this invention are characterized by recurring units represented by the structures:

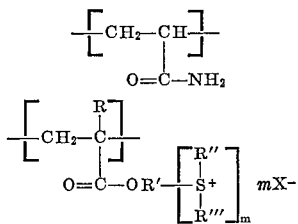

and

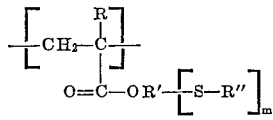

the copolymers consisting essentially of recurring units having the first two structures, while the terpolymers contain all three recurring units.

The novel polymers of this invention can be produced by several different techniques. For example, the alpha-ethylenically unsaturated sulfine can be obtained initially in monomeric form, and subsequently polymerized, together with acrylamide, so as to produce a copolymer thereof, or in the additional presence of an alpha-ethylenically unsaturated thioether, so as to produce terpolymers thereof. To this end, when desired initially in monomeric form, the alpha-ethylenically unsaturated sulfine can be obtained by reacting an alpha-ethylenically unsaturated thio-ether with an alkylating agent in accordance with the equation:

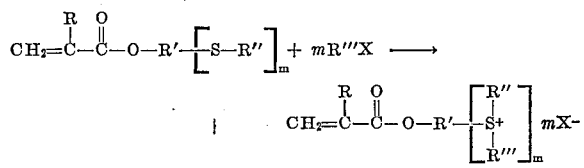

wherein R, R′, R″, R‴, X and m are as defined above. Reactions between a thio-ether and an alkylating agent are in general discussed, for instance, by H. Gilman in "Organic Chemistry," vol. 1, 2nd ed., J. Wiley and Sons, N.Y. (1948) page 867, such teachings being incorporated herein by reference. Concordant therewith, by way of illustration, the alkylation can be carried out by bringing the thio-ether and the alkylating agent into reactive admixture, in a suitable solvent or diluent, if desired, at a temperature of from about 25° C. or slightly lower, up to about 90° C. to 100° C. or slightly higher. In addition, a small amount of a conventional polymerization inhibitor, such as hydroquinone, or the like, is preferably incorporated in the reaction mixture. As typical of the alkylating agents which can be employed in this regard, there can be mentioned dimethyl sulfate, methyl halides such as methyl bromide, methyl iodide and methyl chloride, chloroacetic acid, etc. Moreover, the reaction is preferably carried out in a diluent which is a solvent for the thio-ether, but a non-solvent for the resulting sulfine product, such as benzene, isopropyl ether, etc. The sulfine product can then be separated and recovered in any convenient manner.

The novel copolymers of this invention can thereafter be obtained by polymerizing a mixture of acrylamide and the alpha-ethylenically unsaturated sulfine, in amounts corresponding approximately to those amounts hereinabove described in connection with the polymer composition, i.e., from about 0.2 to about 20 moles and preferably from about 0.6 to about 2.5 moles of acrylamide per mole of sulfine, in contact with a catalytic amount of a free-radical polymerization catalyst or initiator. Typical free-radical polymerization catalysts include, for instance, azo compounds, such as azo-1,1′-diisobutyronitrile, dimethyl azo-2,2′-diisobutyrate, azo-2,2′-bis-(2,4-dimethylvaleronitrile), azo-2,2′-diisobutyramide and the like; peroxides, such as hydrogen peroxide, sodium peroxide, peracetic acid, acetyl peroxide, benzoyl peroxide, potassium persulfate, calcium percarbonate and the like; alkylborons such as tributylboron, or the like; etc. The catalyst is ordinarily incorporated in the polymerization mixture in a concentration of from about 0.01 to about 5 percent or more by weight, and preferably from about 0.2 to about 2 percent by weight, based upon the weight of the monomers, although any catalytic amount thereof can be utilized.

The polymerization is generally effected by bringing the monomers into contact with the catalyst at a temperature of from about −10° C. or slightly lower, to about 120° C. or slightly higher, accompanied by heating or cooling as needed to maintain the temperature at the desired level. The time for the polymerization will depend on a variety of factors, such as the nature of the catalyst and monomers, the reaction temperature, etc., and can vary over a wide range. For example, a suitable reaction time lies in the range of from about 1 hour to about 200 hours, although any period sufficient to produce a polymeric product can be employed. In addition, the polymerization can be carried out under atmospheric, superatmospheric, or subatmospheric pressures, as desired.

Preferably, the polymerization is carried out in diluent which is a solvent for the monomers, and in which the polymer product is insoluble. However, other polymerization techniques, such as bulk, or emulsion polymerizations, etc., are also applicable. Moreover, it has unexpectedly been found in this connection that especially good results are obtained by carrying out the polymerization using as the preferred diluent, either acetone, acetonitrile, an acetone-acetonitrile mixture containing either component in a proportion of from about 1 to about 99 percent by weight, or a constant boiling methyl acetate-methanol mixture, and by dissolving the monomers in such diluent in a concentration of from about 5 to about 50 percent and preferably from about 5 to about 30 percent by weight of total monomer based upon the total weight of the polymerization charge. When conducted in this manner, the resulting polymer is ordinarily obtained as an exceptionally high molecular weight, granular product which is conveniently handled, readily dissolved in water and which is particularly effective as a flocculant as herein described. In contrast therewith, polymer products of like chemical constituency, produced, however, in water or dimethylformamide, were obtained in the form of a clear gel which is useful as a flocculant, but which was difficult to agglomerate and handle, while similar products, produced in benzene, heptane and ethylene dichloride were generally of lower molecular weight and less effective in subsequent use as a flocculant.

Upon completion of the polymerization, the polymer product can be recovered in any convenient manner, such as by filtration, centrifugation, etc. The polymer product, it is to be noted, is generally insoluble in conventional organic solvents, including those in which the monomers are soluble. The reaction product can also be employed directly in many uses for the polymer, obviating the recovery of the polymer per se.

In an alternative manner to the polymerization technique described above, the alkylation of the alphaethylenically unsaturated thio-ether and the polymerization of the monomers can be carried out in one operation by incorporating the alkylating agent in a polymerization mixture containing from about 0.2 to about 20 moles and preferably from about 0.6 to about 2.5 moles of acrylamide per mole of the thio-ether. Moreover, in such a procedure, the reactants must be employed in a ratio of at least about 0.5 mole, and preferably at least about 1 mole, up to about 5 or more moles of the alkylating agent per thio-ether radical, $\{S-R'\}$, of the thio-ether. The polymerization reaction and the recovery of the resulting polymer is carried out as otherwise described above, with similar unexpected advantages accruing when the polymerization is carried out using the preferred diluents described above. In this connection, it is to be noted that the terpolymers of this invention are obtained as products when there is employed less than a stoichiometric amount of alkylating agent with regard to the amount of thio-ether present. In addition, the novel polymers of this invention can also be prepared by reacting the alkylating agent with an initially formed copolymer of acrylamide and the thio-ether, the alkylation and initial polymerization, as well as the recovery of the polymer product, also being carried out as otherwise described above.

The novel polymers of this invention are solid, water-soluble compounds, and when produced by polymerization techniques utilizing the preferred diluents described above, are obtained as granular, readily water-soluble products having a reduced viscosity of from about 0.1 to about 5 and preferably from 0.5 to 2, when measured at a temperature of 30° C. from an 0.5 molar aqueous sodium acetate solution containing 0.2 gram of polymer in 100 milliliters of solution. The term "reduced viscosity" is well known in the polymer art and designates a value obtained by dividing the specific viscosity of a solution of the polymer by the concentration of the polymer in solution, the concentration being measured in grams of polymer per 100 milliliters of solvent. The specific viscosity is obtained by dividing the difference between the viscosity of the polymer solution and the viscosity of the solvent by the viscosity of the solvent. The reduced viscosity of a polymer is regarded as a measure of the molecular weight of the polymer, with higher values indicating higher molecular weights. Moreover, in the case of a polyelectrolyte, such as the polymers of this invention, the reduced viscosity values are best obtained from a dilute aqueous salt solution.

The polymer products of this invention find utility in a wide variety of applications. They can, for example, be used to produce films suitable for use as packaging and coatings. It has been found that the polymers can also be effectively employed as flocculants in the treatment of aqueous anionic suspensions, wherein the dispersion of solid matter is stabilized by a negative charge. This is especially true of the polymers produced by polymerization techniques using the preferred diluents described above. Illustrative of the suspensions which can be flocculated in accordance with this invention there can be mentioned aqueous dispersions or slurries of silica, carbon, clay, biologically treated industrial wastes, such as textile mill wastes, etc., sewage sludge, "white water," i.e. the effluent from paper-making machines used in the conventional manufacture of paper products which contains a suspension of paper-making fibers and which also contains a suspension of fillers and/or pigments such as titanium dioxide and calcium carbonate, etc., and the like. The polymers have in fact been found to be especially effective in the treatment of sewage sludge, and can be employed in this connection to treat raw sludge, digested or partially digested sludge, digested sludge elutriant, etc., i.e. at any of the various stages of conventional sewage treatment. In this manner, the present invention provides a distinct advantage over the use of many conventional flocculants.

The polymers of this invention are employed as flocculants, as further prescribed by the invention, by admixing one or more of them in the suspension for which flocculation is desired in a concentration which can vary broadly in the range of from about 0.01 to about 5 percent by weight of the polymer(s) based upon the weight of the solid dispersed phase. Preferably, polymer concentrations of from about 0.1 to about 2.5 percent by weight are employed. The optimum concentration of polymer may vary, of course, depending upon the suspension being flocculated, the molecular weight of the polymer, etc., and can readily be determined by one skilled in the art in light of this disclosure.

The polymer can be incorporated in the suspension in solid form and dissolved therein or, preferably, introduced as an aqueous solution. Stock solutions of the polymer are most conveniently prepared and utilized in this connection, preferably containing from about 0.25 to about 5 percent by weight of polymer in water. Solutions containing higher polymer concentrations can also be prepared, limited, for practical purposes, only by the increasing viscosity of the solution as the molecular weight and/or concentration of the polymer increases. Any other convenient manner of incorporation and admixing the polymer in the suspension can also be utilized, as can any flocculating quantity of the polymer. The flocculation thus effected is evidenced, for example, by a high rate of dewatering and rapid settling of the suspended solids.

The invention can be illustrated further by the following specific examples of its practice. In the examples, the reduced viscosity values indicated for the polymers were measured at a temperature of 30° C. from 0.5 molar aqueous sodium acetate solution of polymer containing 0.2 gram of polymer in 100 milliliters of solution.

*Example I*

A 300 cc. Pyrex bottle was charged with 8 grams of 2-methylthioethyl acrylate, 12 grams of acrylamide, 100 grams of dry acetonitrile and 0.2 gram of azodiisobutyronitrile. The bottle was flushed with nitrogen, capped and placed in a revolving, constant temperature water bath at a temperature of 50° C. for a period of 20 hours. An acrylamide/2-methylthioethyl acrylate copolymer was formed as a suspension in acetonitrile. The copolymer contained, in polymerized form, and on a theoretical monomer basis, approximately 25 mole percent of the acrylate. A solution of 7 grams of dimethyl sulfate in 100 grams of dry acetonitrile was then added to the suspension in the bottle, whereupon the bottle was returned to the revolving bath for an additional period of 20 hours at a temperature of 50° C. The amount of dimethyl sulfate employed was sufficient to convert essentially all of the polymerized 2-methylthioethyl acrylate units to the corresponding, polymerized form of 2-(acryloxyethyl)dimethylsulfonium methylsulfate units, so that an acrylamide/2-(acryloxyethyl)dimethylsulfonium methylsulfate copolymer was formed as a suspension in acetonitrile. The copolymer contained, in polymerized form and on a theoretical monomer basis, approximately 40 mole percent of the sulfonium compound and 60 mole percent of acrylamide. The polymer suspension was then washed with dry acetone and subsequently filtered to recover the polymer. Thereafter, the polymer was dried at a temperature of 40° C. for a period of 16 hours. In this manner, 26 grams of polymer were obtained as a white powder. The polymer had a reduced viscosity of 0.68.

*Example II*

(A) A polymer having approximately the same chemical composition as the polymer product of Example I, above, but varying therefrom by having a lower molecular weight, was obtained in a manner similar to that described in Example I, using one-half the quantity of each reactant. Thus, 4 grams of 2-methylthioethyl acrylate was initially polymerized with 6 grams of acrylamide in 50 grams of dry acetonitrile by contacting the monomer mixture with 0.1 gram of azodiisobutyronitrile at a temperature of 50° C. for a period of 16 hours. The acrylamide/2-methylthioethyl acrylate copolymer suspension thereby formed was washed with isopropyl ether and filtered to recover the polymer, which was then dried at a temperature of 50° C. for a period of 16 hours. The copolymer, containing, in polymerized form and on a theoretical monomer basis, approximately 26 mole percent of the acrylate, was thereafter brought into reactive admixture with 3.5 grams of dimethyl sulfate in 100 grams of dry acetonitrile at a temperature of 50° C. for a period of 20 hours. The amount of dimethyl sulfate employed was sufficient to convert essentially all of the polymerized 2-methylthioethyl acrylate units to the corresponding, polymerized form of 2-(acryloxyethyl)dimethylsulfonium methylsulfate units, so that an acrylamide/2-(acryloxyethyl)dimethylsulfonium methylsulfate copolymer was formed as a suspension in acetonitrile. The resulting copolymer contained, in polymerized form and on a theoretical monomer basis, approximately 40 mole percent of the sulfonium compounds and 60 mole percent of acrylamide. The polymer suspension was then washed with isopropyl ether and subsequently filtered to recover the polymer. Thereafter, the polymer was dried at a temperature of 50° C. for a period of 16 hours. In this manner, 12 grams of polymer were obtained as a white powder. The polymer had a reduced viscosity of 0.57.

(B) In similar manner to that described above in this example, 4 grams of 2-methylthioethyl acrylate was initially polymerized with 6 grams of acrylamide in 50 grams of dry acetonitrile by contacting the monomer mixture with 0.2 gram of azodiisobutyronitrile at a temperature of 50° C. for a period of 20 hours. To the acrylamide/2-methylthioethyl acrylate copolymer suspension thereby formed, 3.5 grams of dimethylsulfate were subsequently introduced and brought into reactive admixture therewith at a temperature of 50° C. for a period of 20 hours. The amount of dimethyl sulfate employed was sufficient to convert essentially all of the polymerized 2-methylthioethyl acrylate units to the corresponding, polymerized form of 2-(acryloxyethyl)dimethylsulfonium methylsulfate units, so that an acrylamide/2-(acryloxyethyl)dimethylsulfonium methylsulfate copolymer was formed as a slurry in acetonitrile. The resulting copolymer contained, in polymerized form and on a theoretical monomer basis, approximately 40 mole percent of the sulfonium compound and 60 mole percent of acrylamide. The polymer slurry was then diluted with acetone and subsequently filtered to recover the polymer. Thereafter, the polymer was dried at a temperature of 50° C. for a period of 16 hours. In this manner, 12.5 grams of polymer were obtained at a white powder. The polymer had a reduced viscosity of 0.25.

*Example III*

A 300 cc. Pyrex bottle was charged with 25 grams of acrylamide, 25 grams of 2-(acryloxyethyl)dimethylsulfonium methylsulfate, 120 grams of dry acetonitrile and 0.5 gram of azodiisobutyronitrile. The bottle was flushed with nitrogen, capped and placed in a revolving, constant temperature water bath at a temperature of 50° C. for a period of 18 hours. An acrylamide/2-(acryloxyethyl)dimethylsulfonium methylsulfate copolymer was formed as a suspension in acetonitrile. The copolymer contained, in polymerized form and on a theoretical monomer basis, approximately 80 mole percent of acrylamide and 20 mole percent of 2-(acryloxyethyl)dimethylsulfonium methylsulfate. The polymer suspension was then washed with isopropyl ether and subsequently filtered to recover the polymer. Thereafter, the polymer was dried at a temperature of 50° C. for a period of 20 hours. In this manner, 50 grams of polymer were obtained as a white powder. The polymer had a reduced viscosity of 1.7 and was found by analysis to contain about 12 percent by weight of sulfur. The experiment was repeated in identical manner, and a similar copolymer was obtained as a product. The polymer differed only in molecular weight, having a reduced viscosity of 1.0. The two polymers were then blended together to form the product employed as a flocculant as indicated below.

*Example IV*

A 500 cc., 4-neck, flat Pyrex flask, fitted with a glass stirrer, thermometer and condenser, was charged with 15 grams of acrylamide, 10 grams of 2-methylthioethyl acrylate, 9 grams of dimethylsulfate, 200 grams of dry acetonitrile and 0.25 gram of tributylboron. The reactants were stirred under a positive nitrogen pressure, with the flask immersed in a constant temperature water bath at a temperature of 25° C., for a period of 30 minutes. An additional drop of tributylboron was added to the contents of the flask, after which the flask was allowed to remain in the bath, accompanied by continued stirring, for a further period of 1.5 hours. A polymer was formed as a slurry of increasing thickness, whereupon an additional 100 grams of dry acetonitrile were introduced into the flask. The slurry was then heated to a temperature of 50° C., with stirring, over a period of 2 hours, allowed to stand overnight, and finally reheated to a temperature of 50° C., with stirring, over a period of 6 hours. The slurry was then washed with acetone and filtered to recover the polymer. Thereafter, the polymer was dried at a temperature of 50° C. for a period of 16 hours. In this manner, about 34 grams of an acrylamide/2-(acryloxyethyl)dimethylsulfonium methylsulfate copolymer were obtained as a white powder. The polymer contained, in polymerized form and on a theoretical monomer basis, approximately 25 mole percent of the sulfonium compound and 75 mole percent of acrylamide.

*Example V*

A 300 cc. Pyrex bottle was charged with 3 grams of acrylamide, 3 grams of 2-(acryloxyethyl)carboxymethylmethylsulfonium chloride, 12 grams of dry acetonitrile and 0.06 gram of azodiisobutyronitrile. The bottle was flushed with nitrogen, capped and placed in a revolving, constant temperature water bath at a temperature of 50° C. for a period of 18 hours. An acrylamide/2-(acryloxyethyl)carboxymethylmethylsulfonium chloride copolymer was formed as a suspension in acetonitrile. The copolymer contained, in polymerized form and on a theoretical monomer basis, approximately 85 mole per cent of acrylamide and 15 mole percent of the sulfonium compound. The polymer suspension was then washed with acetone and subsequently filtered to recover the polymer. Thereafter, the polymer was dried at a temperature of 50° C. for a period of 16 hours. In this manner, 4.7 grams of polymer were obtained as a white powder. The polymer had a reduced viscosity of 2.08, and was found by analysis to contain about 5.3 percent by weight of chlorine.

*Example VI*

A 300 cc. Pyrex bottle was charged with 6 grams of acrylamide, 2 grams of 2,3-bis(methylthio)propyl methacrylate, 2.3 grams of dimethyl sulfate, 0.08 gram of azodiisobutyronitrile and 40 grams of dry acetonitrile. The bottle was flushed with nitrogen, capped and placed in a revolving, constant temperature water bath at a temperature of 50° C. for a period of 62 hours. An acrylamide/3 - acryloxypropyl - 1,2 - bis(dimethylsulfonium) di(methylsulfate) copolymer was formed as a suspension in acetonitrile. The copolymer container, in polymerized form and on a theoretical monomer basis, approximately 92 mole percent of acrylamide and 8 mole percent of the sulfonium compound. The polymer suspension was then washed with isopropanol and subsequently filtered to recover the polymer. Thereafter, the polymer was dried at a temperature of 50° C. for a period of 16 hours. In this manner, 9.5 grams of polymer were obtained as a white granular powder.

*Example VII*

A 300 cc. Pyrex bottle was charged with 3 grams of acrylamide, 2 grams of 2-(acryloxyethyl)carboxymethylmethylsulfonium chloride, 10 grams of dry acetone and 0.05 gram of azodiisobutyronitrile. The bottle was flushed with nitrogen, capped and placed in a revolving, constant temperature water bath at a temperature of 50° C. for a period of 19 hours. An acrylamide/2-(acryloxyethyl)carboxymethylmethylsulfonium chloride copolymer was formed as a suspension in acetone. The copolymer contaned, in polymerized form and on a theoretical monomer basis, approximately 85 mole percent of acrylamide and 15 mole percent of the sulfonium compound. The polymer suspension was then washed with heptane, and filtered to recover the polymer. Thereafter, the polymer was dried at a temperature of 40° C. for a period of 20 hours. In this manner, 4.8 grams of polymer were obtained as a white powder. The polymer had a reduced viscosity of 1.96.

*Example VIII*

In this example, various polymers of this invention were evaluated as flocculating agents in connection with the flocculation of pigment-containing "white water" suspensions. The evaluation was conducted as follows. A synthetic "white water" was prepared by cutting bleached sulfite pulp into ¼-inch squares. The cut pulp was soaked in water and beaten for a period of 1 hour in a Valley laboratory beater to a consistency of 1.7 percent. A 1-quart aliquot of the beaten pulp, containing 15 grams of pulp fiber in suspension in water, was removed and diluted to 15 gallons with additional water, whereupon 1.5 grams of pigment were also added to the suspension, giving a total solids content of 0.029 percent by weight. One-liter aliquots, containing 0.3 gram of solids, were then removed from the suspension, and were treated with varying amounts of the polymer being evaluated by admixing each aliquot of the suspension with an aqueous solution of the polymer for a short period. The effectiveness of the polymer as a flocculant was determined by measuring the rate of filtration of water from the polymer-treated suspension in the following manner. An inverted Buchner funnel containing No. 1 Whatman filter paper was connected to an evacuated flask, serving as a source of constant vacuum, and immersed for one minute in the treated polymer suspension. The filtrate was collected in a filter flask and measured.

The results obtained are tabulated below in Tables A, B and C. In Table A, the data tabulated was obtained from experiments conducted using kaolinite clay as the sole pigment component of the synthetic "white water"; in Table B, the data tabulated was obtained from experiments conducted using titanium dioxide as the sole pigment component of the synthetic "white water"; and in Table C, the data tabulated was obtained from experiments conducted using titanium dioxide as the sole pigment component of the synthetic "white water." The polymers evaluated were the polymers produced as described above in Examples IIA, III and VII. For comparison, experiments were also conducted employing in one instance, as the polymer, a commercially available polyacrylamide flocculant, and in another instance, substituting for the polymer, another commercially available flocculant, viz., alum, $Al_2(SO_4)_3 \cdot 18H_2O$. In addition, a control experiment was conducted in which no flocculant was employed.

In the tables, the concentration of flocculant is indicated in percent by weight of polymer based upon the weight of pulp in the suspension. The pH is that of the treated suspension. The filtration rate is tabulated in cubic centimeters per minute, i.e., the volume of filtrate collected under standard conditions in one minute. For convenience and clarity the filtration rate has also been converted to a filtration rate ratio according to the formula:

$$\frac{\text{Filtration rate of flocculant-treated ``white water''}}{\text{Filtration rate of untreated ``white water''}} = \text{filtration rate ratio}$$

wherein the denominator represents the filtration rate obtained in the control experiment in which no flocculant was employed. A ratio greater than 1 indicates that flocculation has been engendered, increasing in effectiveness as the ratio increases.

TABLE A

| Flocculant Employed | Concentration of Flocculant | pH | Filtration Rate | Filtration Ratio |
|---|---|---|---|---|
| None | | 6.7 | 165 | 1.0 |
| Alum | 231 | 4.5 | 240 | 1.5 |
| Polyacrylamide | 0.33 | 4.5 | 255 | 1.5 |
| Do | 0.33 | 4.5 | 340 | 2.1 |
| Do | 3.3 | 4.5 | 55 | 0.33 |
| Polymer of Ex. VII | 0.033 | 6.7 | 400 | 2.4 |
| Do | 0.33 | 6.7 | 520 | 3.1 |
| Do | 3.3 | 6.7 | 410 | 2.5 |
| Do | 33 | 6.7 | 65 | 0.39 |

TABLE B

| Flocculant Employed | Concentration of Flocculant | pH | Filtration Rate | Filtration Ratio |
|---|---|---|---|---|
| None | | 7.5 | 170 | 1.0 |
| Alum | 231 | 4.5 | 285 | 1.7 |
| Polyacrylamide | 0.033 | 4.5 | 215 | 1.3 |
| Do | 0.33 | 4.5 | 315 | 1.9 |
| Do | 3.3 | 4.5 | 60 | 0.35 |
| Polymer of Ex. VII | 0.033 | 6.7 | 200 | 1.2 |
| Do | 0.03 | 6.7 | 460 | 2.7 |
| Do | 3.3 | 6.7 | 540 | 3.2 |
| Do | 33 | 6.7 | 135 | 0.8 |

TABLE C

| Flocculant Employed | Concentration of Flocculant | pH | Filtration Rate | Filtration Ratio |
|---|---|---|---|---|
| None | | 8.4 | 160 | 1.0 |
| Polyacrylamide | 0.33 | 8.4 | 110 | 0.69 |
| Polymer of Ex. VII | 0.033 | 8.4 | 380 | 2.4 |
| Do | 0.33 | 8.4 | 270 | 1.7 |
| Do | 3.3 | 8.4 | 375 | 2.3 |
| Do | 33 | 8.4 | 60 | 0.37 |

The superior effectivness of the polymers of this invention as a flocculant is readily apparent from the above tables. It can also be seen that the optimum amount of the flocculant, insofar as effectiveness as a flocculant is concerned, will vary depending upon the particular polymer employed as well as upon the suspension being treated, and that an excessive amount of flocculant may have an adverse, deflocculating effect. Thus, as indicated previously, the optimum amount of flocculant can readily be determined by one skilled in the art in light of this disclosure. In addition, it can be seen that, unlike certain conventional flocculants, the polymers of this invention are effective as flocculants in both acidic and basic environments.

*Example IX*

In this example, the polymer of this invention produced as described above in Example I, was evaluated as a flocculating agent in connection with the flocculation of a digested sewage sludge suspension containing 6 percent total solids, obtained from a commercial sewage treatment plant. The evaluation was conducted as follows. A 0.5 percent solution of the polymer was prepared by sifting 5 grams of the polymer into 995 grams of water, following by admixture with a Lightnin mixer at a speed of about 1750 r.p.m. for a period of one hour. The polymer appearing readily soluble under these low shear conditions. To appraise the shear stability of the polymer under high shear conditions and to insure dissolution, 500 grams (one-half) of the polymer solution was mixed further in a Waring Blendor at a speed of about 15,000 r.p.m. for a period of 4 minutes. The digested sewage sludge suspension was then treated with varying amounts of polymer which, in one instance had been subjected to only low shear mixing, and in another instance, to both low and high shear mixing, by adding 150 milliliter aliquots of aqueous polymer solution to 300 grams aliquots of the sewage sludge suspension in a 500 milliliter graduated cylinder. The contents of the cylinder were initially mixed by inverting the cylinder 30 times, whereupon the contents were transferred to a 600 milliliter beaker and stirred therein for a period of 5 minutes using a paddle-blade stirrer rotating at a speed of about 100 r.p.m. The effectiveness of the polymer as a flocculant was determined by measuring the rate of filtration of water from the polymer-treated suspensions in the following manner. An inverted Buchner funnel, sawed off flush to the perforated disc, was fitted with #40 Whatman filter paper and connected to an evacuated flask, serving as a source of constant vacuum (30 to 40 millimeters of mercury). The funnel was then immersed for 30 seconds in the treated suspension in an inverted position and thereafter allowed to drain in an upright position for another 30 seconds, thus simulating a commercial vacuum drum filtration operation. The filtrate was collected in a filter flask and measured.

The results obtained are tabulated below in Table D. In the table, the designation (a) indicates the polymer was subjected to only low shear mixing during dissolution as described above in this example; the designation (b) indicates the polymer was subjected to both low shear mixing and then to high shear mixing as also described above in this example. The concentration of flocculant is indicated in percent by weight of polymer based upon the weight of sewage sludge solids. The filtration rate is tabulated in cubic centimeters per minute, i.e., the volume of filtrate collected under standard conditions in one minute by the procedure indicated above. For comparison, an experiment was conducted, substituting for the polymer a commercially available ferric chloride flocculant. A control experiment was also conducted in which no flocculant was employed.

TABLE D

| Flocculant Employed | Concentration of Flocculant | Filtration Rate |
|---|---|---|
| None | 0 | 8 |
| Polymer of Ex. I (a) | 0.3 | 73 |
| Do | 0.5 | 112 |
| Do | 0.8 | 160 |
| Do | 1.0 | 250 |
| Do | 1.25 | 256 |
| Do | 1.5 | 206 |
| Polymer of Ex. I (b) | 0.2 | 80 |
| Do | 0.3 | 100 |
| Do | 0.4 | 138 |
| Do | 0.5 | 176 |
| Do | 0.6 | 228 |
| Do | 0.7 | 232 |
| Do | 0.8 | 254 |
| Do | 1.0 | 218 |
| Do | 1.25 | 188 |
| Ferric Chloride | 2.0 | 43 |
| Do | 3.0 | 58 |
| Do | 4.0 | 78 |
| Do | 5.0 | 92 |
| Do | 6.0 | 98 |
| Do | 8.0 | 104 |

The improved flocculating effectiveness of the polymer of this invention is again apparent from the above table. In similar manner, the polymer product of Example VI is also employed effectively as a flocculant.

*Example X*

In this example, various polymers of this invention were evaluated as flocculating agents in connection with the flocculation of a digested sewage sludge suspension. The evaluation was conducted as follows. A stock solution of each polymer tested was prepared by adding 2 grams of the polymer to 200 grams of water, followed by low shear admixture with a Lightnin mixer at a speed of about 900 r.p.m. for a period of 2 hours. To insure dissolution of the polymer, the solution was mixed further under high shear conditions in a Waring Blendor at a speed of about 15,000 r.p.m. for a period of 3 minutes. Aliquots of the polymer solution were then diluted with additional water to a total volume of 60 milliliters and added to 200 gram aliquots of a digested sewage sludge suspension containing 5 percent total solids by weight, obtained from a commercial sewage treatment plant. After being stirred gently for a period of 1 minute, the polymer-treated sewage sludge was poured into a vacuum filtration apparatus consisting of a 9 centimeter diameter Buchner funnel equipped with No. 4 Whatman filter paper and adapted to a 250 milliliter graduated cylinder, which was in turn connected to a water aspirator, serving as a vacuum source. The volume of filtrate obtained from the polymer-treated sewage sludge and collected in the graduated cylinder was recorded at frequent intervals until the dewatering of the sewage sludge ceased. This procedure was repeated using various proportions of flocculant to sewage sludge until a maximum filtration rate was attained. The concentration of flocculant was calculated as a percentage ratio of the weight of polymer to the weight of the sludge's solid fraction on a dry basis. In addition, for control purposes, an experiment was conducted in which no flocculant was employed.

The data obtained were interpreted according to the relationships developed by Dr. P. Coackley as described in Biological Treatment of Sewage and Industrial Wastes, J. McCabe, ed., vol. 2, Reinhold Publishing Corp., New York, 1958, pp. 270–91. The relationships derived express the filterability of the flocculated sludge in terms of the "specific resistance" of the sludge. Relative specific resistances can be determined from data collected by the Buchner funnel technique as hereinabove described. When the filtration pressure, filtrate viscosity, solids content of the sludge, and filter area are all held constant, the specific resistances of various sludges are proportional to their "filtration gradients." The filtration gradient is expressed as the slope of the plot of $t/V$ vs. $V$, where "$t$" is time in seconds and "$V$" is filtrate volume in milliliters. The filterability is inversely proportional to the specific resistance; hence, it is also inversely proportional to the filtration gradient.

This technique provides a convenient means of comparing the effectiveness of various flocculants. Since a major commercial application of flocculants will involve their use in conjunction with rotary vacuum filters, the various flocculants can be compared on the basis of the anticipated increase in filter yield (lb. dry flocculated solids/sq. ft. of filter area/hr.) accomplished by flocculation of the sludge. The filter yield has been reported to be inversely proportional to the square root of the specific resistance of the filter cake. Since specific resistance is proportional to filtration gradient under the conditions of this procedure, filter yield is also inversely proportional to the square root of the filtration gradient.

The data obtained, and the relationships derived therefrom, are tabulated below in Table E. In the table the optimum concentration indicates the lowest concentration of flocculant at which a maximum rate of filtration was attained, and is indicated in percent by weight of polymer based upon the weight of sewage sludge solids; the filtration gradient, designated in seconds/centimeter$^6$, indicates the slope of the plot of $tv/V$, wherein $t$ and $V$ are as defined above. For convenience and comparison, the filtration gradient has also been converted to a filtration improvement factor according to the formula $$\frac{\text{Filtration gradient of flocculant-treated sludge}}{\text{Filtration gradient of flocculant-untreated sludge}} = \text{filtration improvement factor}$$

wherein the denominator represents the filtration gradient obtained in the control experiment in which no flocculant was employed. The filter yield improvement factor is the square root of the filtration improvement factor.

TABLE E

| Flocculant | Optimum Concentration | Filtration Gradient | Filtration Improvement Factor | Filter Yield Improvement Factor |
|---|---|---|---|---|
| Polymer of Example IIA | 2.4 | 0.00044 | 1,140 | 34 |
| Polymer of Example III | 2.4 | 0.023 | 22 | 5 |
| None | | 0.50 | | |

*Example XI*

A series of experiments were conducted in a manner similar to that described above in Example X, with the following exception, viz., that only a portion of the stock solution of each polymer tested was subjected to high shear mixing in a Waring Blendor as indicated above. The data obtained, and the relationships derived therefrom, are tabulated below in Tables F and G as described above in connection with Table E. The data tabulated in Table F were obtained from experiments employing a digested sewage sludge suspension containing 3 percent total solids by weight; the data tabulated in Table G were obtained from experiments employing a digested sewage sludge suspension containing about 6 percent total solids by weight; both sludge samples being obtained from a commercial sewage treatment plant. In the tables, the data tabulated in column A were obtained from experiments in which the polymer solution was subjected to only low shear mixing during its preparation. The data tabulated in column B were obtained from experiments in which the polymer solution was also subjected to high shear mixing during its preparation.

TABLE F

| Flocculant | A | | B | |
|---|---|---|---|---|
| | Optimum Concentration | Filtration Gradient | Optimum Concentration | Filtration Gradient |
| Polymer of Example V | ¹ 3.3 | 0.00045 | 3.3 | 0.00159 |
| Polymer of Example VII | ¹ 2.5 | 0.00047 | 2.5 | 0.00138 |
| None | | 0.31 | | |

¹ Higher concentrations were not tested.

TABLE G

| Flocculant | A | | B | |
|---|---|---|---|---|
| | Optimum Concentration | Filtration Gradient | Optimum Concentration | Filtration Gradient |
| Polymer of Example IIB | 1.1 | 0.00011 | 0.7 | 0.00040 |
| Polymer of Example I | 1.4 | 0.00021 | 0.9 | 0.00037 |
| Polymer of Example IV | 1.8 | 0.00016 | 1.4 | 0.00039 |
| None | | 0.25 | | |

The polymers of this invention have also been found effective as flocculating agents in connection with the flocculation of aqueous suspensions containing clay, carbon black and silica.

What is claimed is:

1. A process for the production of a solid, granular high-molecular weight copolymer of acrylamide and an alpha-ethylenically unsaturated sulfine of the general formula:

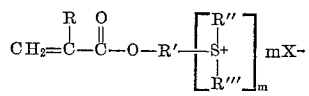

wherein R designates a member selected from the group consisting of the hydrogen atom and the methyl radical, R' designates a saturated aliphatic hydrocarbon radical containing from 1 to 4 carbon atoms, R'' designates an alkyl radical containing from 1 to 4 carbon atoms, R''' designates a member selected from the group consisting of the methyl and carboxymethyl radicals, X designates a member selected from the group consisting of the bromine, iodine and chlorine atoms and the methyl sulfate radical, such that X designates a chlorine atom where R''' designates a carboxymethyl radical, and $m$ designates an integer of from 1 to 2, said copolymer containing, in polymerized form and on a theoretical monomer basis, from about 20 to about 95 mole percent of acrylamide and from about 80 to about 5 mole percent of said ethylenically unsaturated sulfine and having a reduced viscosity of from about 0.1 to about 5 as measured at a temperature of 30° C. from a 0.5 molar aqueous sodium acetate solution containing 0.2 gram of said copolymer in 100 milliliters of said solution, which process comprises reacting said acrylamide and said ethylenically unsaturated sulfine in admixture in a mole ratio of from about 0.2 to about 20 moles of said acrylamide per mole of said sulfine, in a solvent selected from the group consisting of acetone, acetonitrile and mixtures thereof, at a temperature of from about −10° C. to about 120° C. and in contact with a free-radical polymerization catalyst.

2. The method according to claim 1 wherein the ethylenically unsaturated sulfine is 2-(acryloxyethyl)dimethylsulfonium methylsulfate.

3. The method according to claim 1 wherein the ethylenically unsaturated sulfiine is 2-(acryloxyethyl)carboxymethylmethylsulfonium chloride.

4. A process for the production of solid, granular, high molecular weight copolymers of acrylamide and an alpha-ethylenically unsaturated sulfine of the general formula:

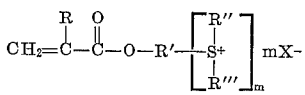

wherein R designates a member selected from the group consisting of the hydrogen atom and the methyl radical, R' designates a saturated aliphatic hydrocarbon radical containing from 1 to 4 carbon atoms, R" designates an alkyl radical containing from 1 to 4 carbon atoms, R'" designates a member selected from the group consisting of the methyl and carboxymethyl radicals, X designates a member selected from the group consisting of the bromine, iodine and chlorine atoms and the methyl sulfate radical, such that X designates the chlorine atom when R'" designates the carboxymethyl radical, and $m$ designates an integer of from 1 to 2, said copolymer containing, in polymerized form and on a theoretical monomer basis, from about 20 to about 95 mole percent of acrylamide and from about 80 to about 5 mole percent of said ethylenically unsaturated sulfine and having a reduced viscosity of from about 0.1 to about 5 as measured at a temperature of 30° C. from a 0.5 molar aqueous sodium acetate solution containing 0.2 gram of said copolymer in 100 milliliters of said solution, which process comprises reacting said acrylamide in admixture with (a) an alpha-ethylenically unsaturated thio-ether of the general formula:

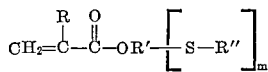

wherein R, R', R" and $m$ are as defined above, and (b) an alkylating agent of the formula R'"X wherein R'" and X are as defined above, in a ratio of from about 0.2 to about 20 moles of said acrylamide per mole of said thio-ether and at least about one mole of said alkylating agent per thio-ether radical of said thio-ether, in a solvent selected from the group consisting of acetone, acetonitrile and mixtures thereof, at a temperature of from about −10° C. to about 120° C. and in contact with a free-radical polymerization catalyst.

5. The method according to claim 4 wherein the ethylenically unsaturated thio-ether is 2-methylthioethyl acrylate and wherein the alkylating agent is dimethyl sulfate.

References Cited by the Examiner
UNITED STATES PATENTS

| | | | |
|---|---|---|---|
| 2,540,794 | 2/1951 | Otto et al. | 260—79.7 |
| 2,594,579 | 4/1952 | Novotny et al. | 260—79.7 |
| 2,874,131 | 2/1959 | Hwa | 260—79.7 |
| 2,885,357 | 5/1959 | Archibald et al. | 210—54 |
| 2,925,406 | 2/1960 | McCurdy | 260—79.7 |
| 2,957,821 | 10/1960 | Schifferli | 210—54 |

JOSEPH L. SCHOFER, *Primary Examiner.*

LEON J. BERCOVITZ, *Examiner.*

D. K. WEDDING, F. L. DENSON, *Assistant Examiners.*